(12) United States Patent
Boodaghians et al.

(10) Patent No.: US 10,017,931 B2
(45) Date of Patent: Jul. 10, 2018

(54) MULTI-PORT VALVE

(71) Applicant: MAG Aerospace Industries, LLC, Carson, CA (US)

(72) Inventors: Razmik B. Boodaghians, Glendale, CA (US); Timothy Birbeck, Torrance, CA (US); Sebastien Weber, Irvine, CA (US); Nguyen Tram, Chino Hills, CA (US); Kevin Huang, Hermosa Beach, CA (US); David Beach, Seal Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 9 days.

(21) Appl. No.: 15/331,062

(22) Filed: Oct. 21, 2016

(65) Prior Publication Data

US 2017/0037607 A1 Feb. 9, 2017

Related U.S. Application Data

(63) Continuation-in-part of application No. 15/249,643, filed on Aug. 29, 2016, which is a continuation of application No. 14/055,903, filed on Oct. 17, 2013, now Pat. No. 9,428,896.

(60) Provisional application No. 61/714,912, filed on Oct. 17, 2012.

(51) Int. Cl.
| | |
|---|---|
| *E03D 5/00* | (2006.01) |
| *F16K 11/074* | (2006.01) |
| *E03F 1/00* | (2006.01) |
| *E03D 5/10* | (2006.01) |
| *B64D 11/02* | (2006.01) |

(52) U.S. Cl.
CPC ............... *E03D 5/00* (2013.01); *B64D 11/02* (2013.01); *E03D 5/105* (2013.01); *E03F 1/006* (2013.01); *F16K 11/074* (2013.01); *Y02T 50/46* (2013.01)

(58) Field of Classification Search
CPC ............ E03D 5/00; E03D 5/012; B64D 11/02
USPC .............................................................. 4/323
See application file for complete search history.

(56) References Cited

U.S. PATENT DOCUMENTS

| | | | | |
|---|---|---|---|---|
| 4,713,847 A | * | 12/1987 | Oldfelt ............... | B64D 11/02 137/192 |
| 5,664,761 A | | 9/1997 | Weyand et al. | |
| 6,216,285 B1 | * | 4/2001 | Olin .................... | E03F 1/006 4/321 |
| 6,325,356 B1 | * | 12/2001 | Rozenblatt ......... | B64D 11/02 251/301 |
| 6,353,942 B1 | * | 3/2002 | Pondelick ........... | E03D 11/02 137/588 |
| 2015/0128337 A1 | | 5/2015 | Beach et al. | |

FOREIGN PATENT DOCUMENTS

DE 102012023078 5/2014

OTHER PUBLICATIONS

European Patent Application No. 17197391.0, Search Report, dated Mar. 13, 2018.

* cited by examiner

*Primary Examiner* — Huyen Le
(74) *Attorney, Agent, or Firm* — Kilpatrick Townsend & Stockton LLP; Dean W. Russell; Kristin M. Crall (57) ABSTRACT

Embodiments of the present invention relate generally to multi-port valves for use in controlling the direction of fluids and mixed media, and find particular use in connection with toilet systems, such as vacuum toilet systems.

12 Claims, 13 Drawing Sheets

MULTI-PORT VALVE

CROSS REFERENCE TO RELATED APPLICATIONS

This application is a continuation-in-part of U.S. Ser. No. 15/249,643 filed on Aug. 29, 2016 titled "Multi-Port Orbital Valve," which application is a continuation of U.S. application Ser. No. 14/055,903, filed Oct. 17, 2013, titled "MULTI-PORT ORBITAL VALVE," now issued as U.S. Pat. No. 9,428,896, which application claims the benefit of U.S. Provisional Application Ser. No. 61/714,912, filed Oct. 17, 2012, titled "Multi-Port Orbital Valve," the entire contents the each of which are hereby incorporated by reference.

FIELD OF THE INVENTION

Embodiments of the present invention relate generally to multi-port valves for use in controlling the direction and/or flow of fluids and mixed media, and find particular use in connection with toilet systems, such as vacuum toilet systems.

BACKGROUND

Aircraft and other passenger transport vehicles typically have on-board lavatories with vacuum toilet systems. These systems typically include a waste-receiving toilet bowl connected to a main waste tank via a sewer pipe or main waste line. A discharge or flush valve is typically mounted on the sewer pipe to selectively allow fluid communication between the toilet bowl and the main waste tank. To power the toilet system, the waste reservoir is maintained under a pressure that is substantially lower than the pressure in the waste-receiving toilet bowl, which is typically under the near-atmospheric pressure of the aircraft's passenger cabin. Thus, when the discharge valve is opened, the pressure differential between the bowl and the reservoir causes the waste in the bowl to be drawn through the pipe into the waste reservoir.

The vacuum created for the flushing action may either be via one or more vacuum pumps, or, in the case of an aircraft in flight, via a pressure differential. For example, aircrafts typically have a vacuum disposal system that applies a vacuum to pull waste media and flush water/spent water from toilets and/or sinks into an on-board waste water storage tank. The suction is generated either by the pressure differential between the pressurized cabin and the reduced pressure outside of an aircraft at high flight altitudes or by a vacuum generator at ground level or at low flight altitudes.

In vacuum waste systems, this differential pressure is what drives the collected mixed media (which can be solid and/or liquid human waste along with other waste items, such as paper products) from the toilet bowl into an accumulation point. The discharge valve should provide an interface for such a vacuum system without venting the pressure differential completely. It should also allow for the controlled addition of material into the ambient-pressure environment, while providing a leak-free obstruction that can be moved or rotated in a controlled manner so as to allow for the passage of waste from the ambient-pressure environment (e.g., the toilet bowl) to the low pressure environment (e.g., the waste tank). The discharge valve is then returned to its closed position in order to prevent further movement of media and/or waste into the waste tank until the next flush is activated.

Although efficient, vacuum toilets create a loud noise level during the flush cycle, due to the amount of vacuum that needs to be applied in order to cause the septic waste to travel from the toilet basin to the holding tank. The loud flushing sound is created when the flush valve opens. The differential pressure forcefully draws the waste down the drain, and the pressure differential must be large enough to cause the waste to flow the entire distance from the toilet basin to the septic holding tank.

Because the main holding tank can be located quite far from the lavatory, the assignee of the present application has developed a two-stage flush system that uses an intermediate holding tank or reservoir. Aspects of this design are described in co-pending U.S. Ser. No. 13/804,539 titled "Two-Stage Flush and Grey Water Flush Systems and Devices." The intermediate tank described in that application functions as a transient tank between the toilet bowl and the main waste tank. It is generally positioned in fluid communication with the toilet bowl. In some embodiments, the intermediate tank is positioned beneath the toilet bowl in the lavatory plumbing. A first valve controls the flow from the toilet to the intermediate holding tank. A second valve (or valve system) controls the flow from the intermediate holding tank to the main waste tank. Improved features for either the first and/or the second valve or second valve system are provided herein. The embodiments described herein, however, may also be used with a system that employs a single flush that delivers waste directly from the toilet basin to the main

BRIEF SUMMARY

Embodiments of the invention described herein thus provide improved multi-port valves that are particularly designed for use with flushing systems and venting. In one embodiment, there is provided a valve, comprising: a valve housing enclosing a flush plate; the valve housing comprising a waste opening and a vent opening; the flush plate comprising a first plate opening, an elongated vent opening, an axis of rotation, wherein rotation of the flush plate with respect to the axis of rotation either (i) closes the waste and vent openings of the housing, (ii) opens the vent opening of the housing by at least partially aligning the elongated vent opening of the flush plate with the vent opening of the housing, (iii) opens the waste opening of the housing by at least partially aligning the first opening of the flush plate with the waste opening of the housing, or a combination of (ii) and (iii), wherein whenever the waste opening of the housing is open to vacuum, the vent opening of the housing is also open to vent. In one example, the flush plate allows both the waste and vent openings of the housing to be simultaneously open. Movement of the flush plate may be activated by a vacuum sensor, a pressure sensor, a capacitance sensor, or a level sensor.

The system has a vent line in fluid communication with the vent opening of the housing. In some examples, the vent line has a check valve in its flow path. In a specific example, there is provided a valve system for an aircraft vacuum toilet lavatory, the valve system, comprising a valve housing enclosing a flush plate; the valve housing comprising a waste opening and a vent opening; the flush plate comprising a first plate opening, an elongated vent opening, an axis of rotation, and a vent line associated with the valve housing and venting to the lavatory atmosphere; wherein rotation of the flush plate with respect to the axis of rotation either (i) closes the waste and vent openings of the housing, (ii) opens the vent opening of the housing by at least partially aligning the elongated vent opening of the flush plate with the vent opening of the housing, (iii) opens the waste opening of the housing by at least partially aligning the first opening of the flush plate with the waste opening of the housing, or a combination of (ii) and (iii), wherein whenever the waste opening of the housing is open to vacuum, the vent opening of the housing is also open to vent;

DETAILED DESCRIPTION

Embodiments of the present invention provide a multi-port valve system. In one aspect, the valve system functions as a flush valve for a vacuum toilet, particularly a vacuum toilet on-board a passenger transport vehicle. Although the valve system is described for use with a toilet system, and specifically for use with a vacuum toilet for use on-board a passenger vehicle such as an aircraft, it should be understood that this valve system 10 may be used with any other system that seeks to use a valve across a pressure differential situation and/or a valve that can transport fluid and/or mixed media. Examples of alternate uses include but are not limited to facility-based vacuum waste systems, facility-based vacuum transport systems, mixed media processes in oil and gas industries, conditional overboard venting in aerospace applications, or any other appropriate instance when a valve system is needed.

Figure 1:
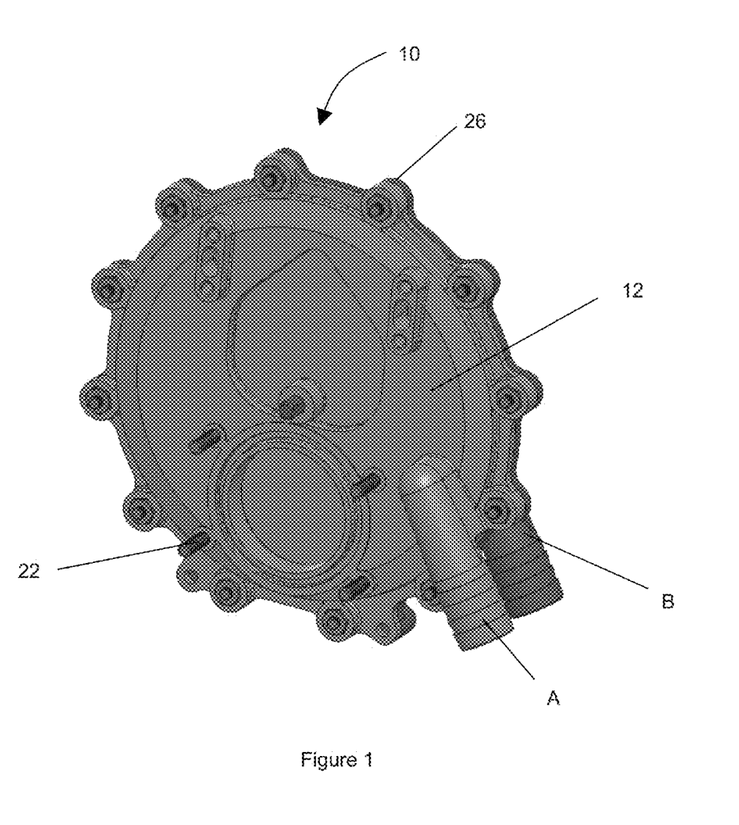
FIG. 1 shows a side perspective view of one embodiment of a valve system housing.
Figure 2:
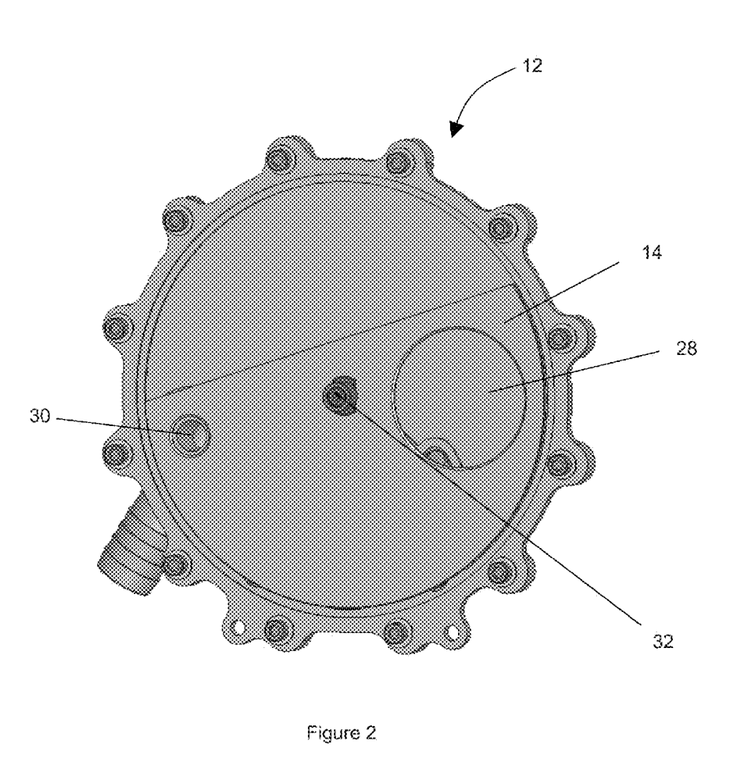
FIG. 2 shows a side perspective view of a valve system housing with one half of the housing removed to show the flush plate therein.
Figure 11:
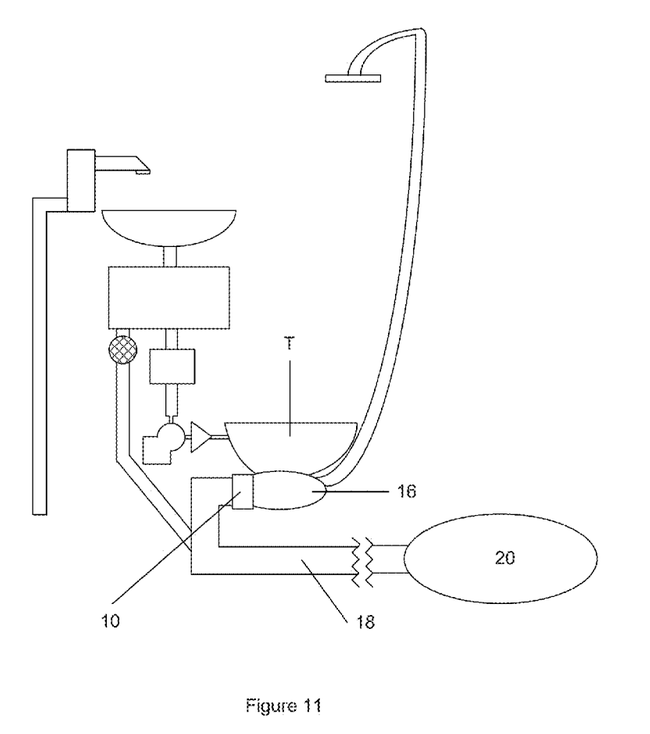
FIG. 11 shows a side plan view of a vacuum waste system using a valve system.
Figure 12:
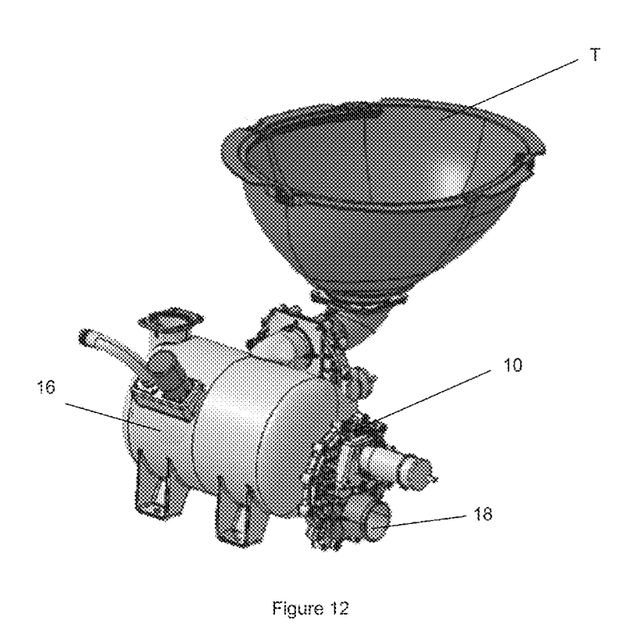
FIG. 12 shows a side perspective view of a toilet bowl that evacuates into an intermediate holding tank.

As shown in FIGS. 1 and 2, the valve system 10 includes a valve housing 12 which encloses a flush plate 14. This internal flush gate or plate 14 may be used to activate two separate gates of the housing. FIGS. 11 and 12 show an overview of one potential location and use for the exemplarity valve system provided herein. It should be understood, however, that the described valve systems may be useful for other applications that require a multi-port valve. In these figures, the valve system 10 is generally positioned between an intermediate holding tank 16, which is designed to receive and hold waste materials from a toilet, and the sewer line 18 that delivers waste materials to a main waste holding tank 20 on-board the vehicle. The intermediate holding tank 16 functions as a reservoir or transient tank, because it holds waste from an initial first stage flush. In the first stage flush, waste material and flush water is delivered from a toilet bowl T to the reservoir 16. The reservoir 16 is designed to hold the waste until the reservoir tank 16 becomes full, until a certain number of flushes has been reached, once a certain hydrostatic pressure is reached, or any other appropriate set stimuli. When it is time to empty the reservoir 16, a second flush stage occurs. In the second stage of the flush, the accumulated waste material and flush water is then delivered from the intermediate holding tank 16 to the main waste holding tank 20. The valve system 10 described herein helps manage the desired flush sequence, while also maintaining the desired pressure in the system and allowing the system to vent.

Other examples of instances in which the disclosed valve may be useful include other flushing systems on-board vehicles that use vacuum-assisted flushing processes. Embodiments find particular use in connection with aircraft vacuum toilets, in which flushes occur at high altitude (using air differential pressure) as well as at low altitude (using a vacuum generator).

It should also be understood that the features described herein may be useful in connection with other flush valve and mechanisms. For example, the present assignee has a related application for a mixed media flush valve pending, U.S. Ser. No. 13/833,426 for "Mixed Media Orbital Valve." One or more features described in that application may be incorporated into the multi-port valve described herein, and vice versa.

The housing 12 of the valve system 10 has a media inlet 22 and a media outlet 24. In use, the media inlet 22 receives waste materials and fluid from the reservoir 16, directly from a toilet basin, or from any other waste-collecting structure. The media outlet 24 provides a connection to the sewer pipe 18, which delivers the waste to the main waste tank 20 such that waste travels out of the valve system 10 through outlet 24. (It should be understood that the inlet 22 and outlet 24 may be interchangeable. The direction of flow is not specific to orientation of valve; the flow simply need enter on side of the housing and exit on the other side. (The combined opening through the housing cross-section will be referred to as a collective opening 23 below.) The valve housing 12 also has a vent opening 26. The vent opening 26 functions to evacuate or vent air. It provides a pathway between the valve system 10 interior and the ambient conditions immediately outside valve.

Figure 14:
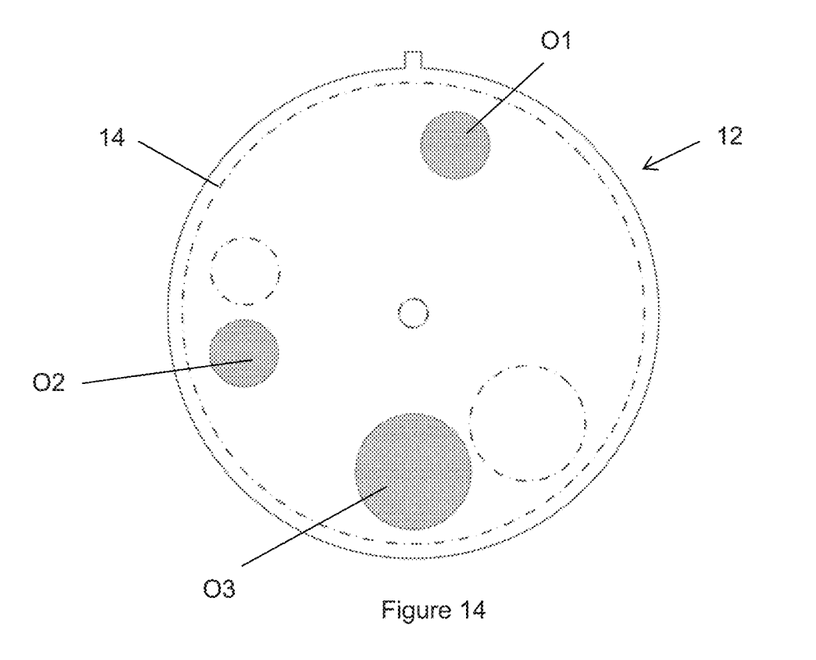
FIG. 14 shows one example of an alternate housing having more than two openings.

Although a housing 12 with two openings is shown, it should be understood that more than two openings may be provided, depending upon the surface area, the size of the openings, and the flush needs required. For example, a housing may be provided as having three, four, five, or more openings. FIG. 14 shows a housing 12 having three openings, O1, O2, and O3. Further openings may be added as well, for example, four, five, or more openings may be provided. For example, in one embodiment, one or more of the additional openings may be provided as a supplemental vent. This vent may vent the system to an alternate location in order to control odor or for any other reason. (Embodiments providing a specific version of a supplemental venting feature are described further below and are illustrated by FIGS. 15-19.)

The housing 12 may be made of any appropriate material. In some instances, the housing is metallic, such as stainless steel or titanium. In other instances, the housing may be plastic. It one embodiment, the housing may be made of a thermoplastic resin. It one embodiment, the housing made of a polymeric material that has good mechanical, thermal (to resist high temperatures), and chemical (resistance) properties. Specific examples of potential materials include but are not limited to polymers, polyetherimides (such as Ultem resin), nylons, such as nylon D80 or nylon 11, polypropylenes, acrylonitrile butadiene styrenes, polyethylenes, stereolithography resins (such as Somos® NeXt), carbon composite materials, carbon fibers in an epoxy matrix, polycarbonates, or any other appropriate materials, or any combination thereof. Without wishing to be bound to any theory, it is believed possible that providing the housing out of a plastic-like material may help the housing recover its original shape in the event of any abnormal or unintended shaving action of the flush plate.

Figure 3:
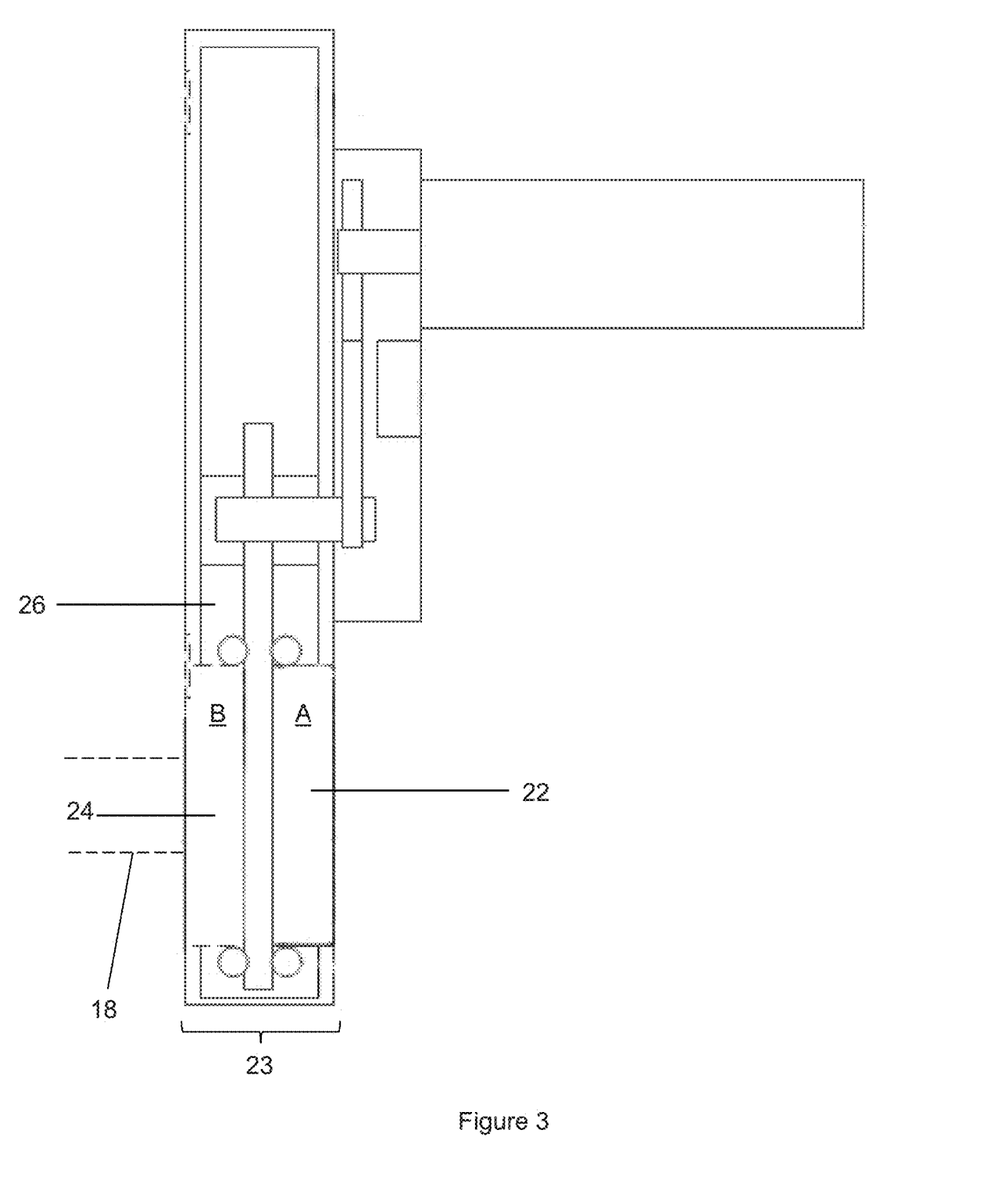
FIG. 3 shows a side cross sectional view of a valve system.

As shown in FIGS. 1 and 3, the housing 12 has two halves (A and B). The waste inlet 22/outlet 24 opening collectively form a first opening 23 that extends through both halves A, B of the housing 12. The vent opening 26 also extends through both halves of the housing 12. A flush plate 14 is provided between the two halves in order to control the opening and closing of the inlet 22/outlet 24 (collectively, the opening 23) and the vent 26 opening as desired.

Figures 4, 5, 6:
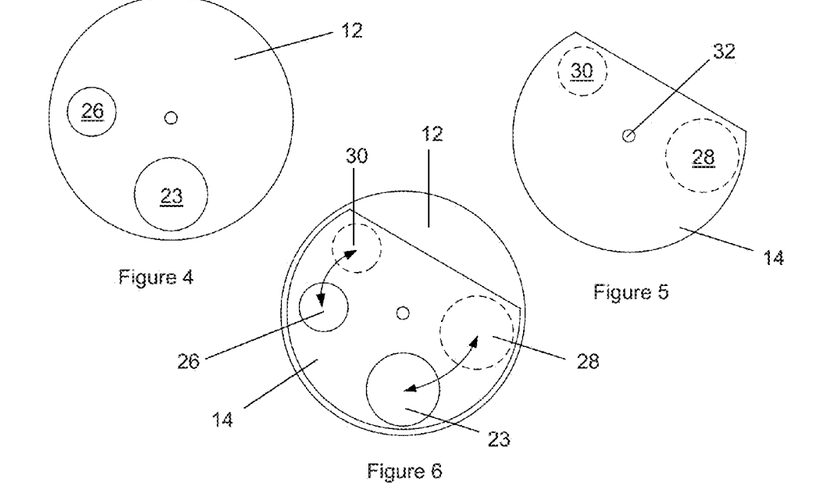
FIG. 4 shows a schematic view of one embodiment of a valve system housing.
FIG. 5 shows a schematic view of one embodiment of a flush plate.
FIG. 6 shows a schematic of a flush plate in place in a housing.

As shown in FIGS. 2 and 5, the plate 14 has a first opening 28 and a second opening 30. The plate openings 28 and 30 are generally positioned as mirror images of the openings 23, 26 of the housing 12, as shown in FIGS. 4 and 5. This means that in use, at least one of the plate openings corresponds generally to at least one of the housing openings. This correspondence is generally in size and in location. In a specific example, first plate opening 28 corresponds in size and location to housing opening 23 when the plate 14 is positioned between both halves of the housing 12. Second plate opening 30 corresponds in size and location to vent opening 26. The plate openings 28 and 30 are generally similarly sized as openings 23, 26 of the housing 12. Although flush plates 14 with two openings are shown, it should be understood that more than two openings may be provided, depending upon the surface area of the flush plate, the size of the openings, and the flush needs required. For example, a flush plate may be provided as having three, four, five, or more openings.

In one particular embodiment, the openings may be about 1", 1.5", or about 1.75 inches in diameter. In other embodiments, the openings may be from about 1 inch to about 3 inches in diameter, from about 1, 1.5, 2, 2.5, 3, 3.5, 4, 4.5 inches in diameter, and may be as large as 5 or 10 inches in diameter or larger, depending upon the size of the plate 14 and housing 12 and the ultimate use for the valve system. In other embodiments, the openings may as small as a half inch to one millimeter in diameter or smaller, depending upon the size of the plate 14 and housing 12 and the ultimate use for the valve system.

In another particular embodiment, the openings are spaced approximately 135° from one another. In other embodiments, the openings may be spaced from about 80 to about 175° from one another, from about 90 to about 165° from one another, from about 100 to about 155° from one another, from about 120° from one another, from about 130° from one another, from about 140° from one another, from about 145° from one another, from about 150° from one another, or any other appropriate distance as various applications as modified.

The flush plate may be made of any appropriate material. In some instances, the flush plate is metallic, such as stainless steel or titanium. These materials are corrosion resistant, and the plate is in contact with corrosive materials. In other instances, the flush plate may be plastic or any of the above-described materials for the housing. In some embodiments, the flush plate 14 may be coated. For example, a protective coating may be provided that helps give the plate features such as non-corrosion, non-stick, and so forth. In a specific aspect, the plate may be coated with a Teflon coating. In a further specific aspect, the plate may be coated with a non-stick and/or a non-corrosive coating or material. The housing 12 and flush plate 14 may be made of the same or different materials.

Figure 7:
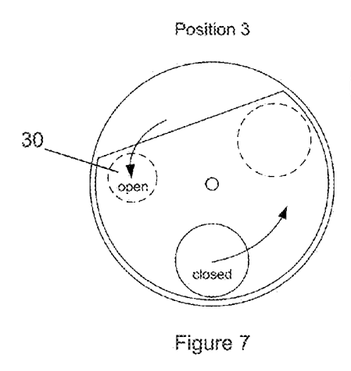
FIG. 7 shows one example of a waste opening of the valve housing being closed but the vent opening being open.
Figure 8:
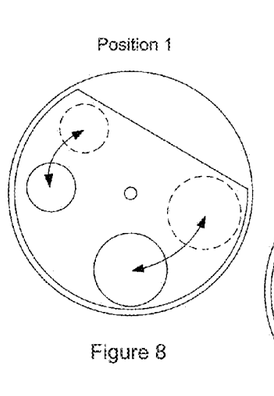
FIG. 8 shows one example of a waste opening of the valve housing being closed and the vent opening being closed.
Figure 9:
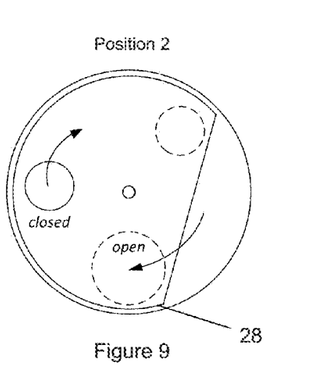
FIG. 9 shows one example of a waste opening of the valve housing being open but the vent opening being closed.

The plate 14 also has an axis of rotation 32 which allows it to rotate within the housing 12 in order to open and close the housing openings 23 and/or 26. FIG. 6 shows the plate and housing together. As shown in FIG. 7, movement of the flush plate 14 allows the plate openings 28, 30 to leave both housing openings 23, 26 covered. This is referred to as Position 1. In Position 1, the valve system seals the interior of the tank 16 from the vacuum of the sewer line.

When it is time for the tank 16 to be evacuated, the plate opening 28 is moved into alignment with the housing opening 23. This is referred to as Position 2. In Position 2, the valve system 10 opens the interior of the tank 16 to the vacuum of the sewer line. This opens the inlet port 22 and vacuum pulls the waste material/fluid from the tank 16, through the valve system 10, out of outlet 24, and into the sewer pipe line 18. This uncovered position allows the generated vacuum to be activated and flow through valve system 10.

When the tank 16 has been evacuated and it is time for the waste opening 23 of the housing to be closed, the flush plate 14 is moved to the position where the opening 23 is closed. In one embodiment, the plate may be moved back to Position 1. In another embodiment, the flush plate 14 may be used to provide a venting function. The flush plate 14 may be moved so that opening 30 is in alignment with vent opening 26. This is referred to as Position 3. In Position 3, the waste opening 23 is sealed, but the vent opening 26 is open. This position exposes the interior of the tank 16 to vacuum without evacuating the waste. It can allow vacuum to build within the tank.

Figure 10:
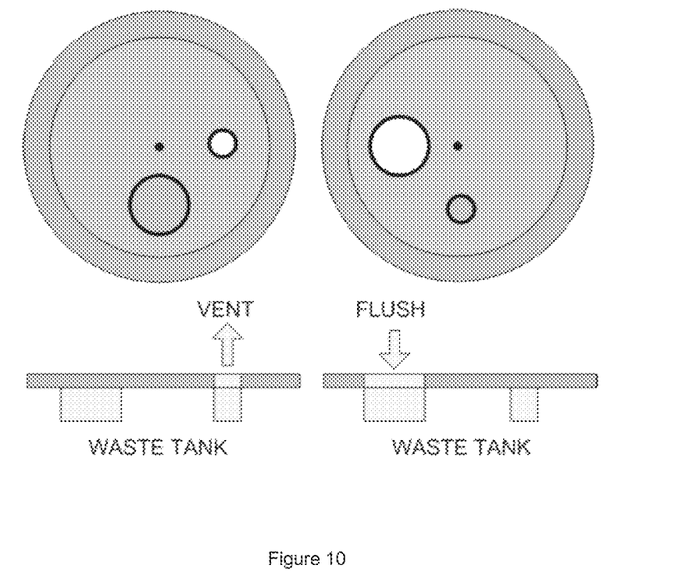
FIG. 10 shows a schematic of the flow of waste through the vent system.

FIG. 10 shows a schematic illustrating the option for allowing venting then movement of the plate for flushing.

On the holding tank 16 side (or waste-collecting side) of the valve system 10, a fitting may be bonded to the vent opening 26 to allow control of airflow, velocity, and direction. Such a fitting may also be required in order to meet aerospace requirements for flood-line level. For example, vent 26 may be required to vent to a location above the highest possible flood-level line such that the valve interior will not leak through vent 26 in the case of a catastrophic seal failure. For this purpose, tubing may be attached to a vent fitting on the holding tank 16 side, with the opposing end of the tubing generally located above the flood-level line of the tank 16. The vent may be useful to alleviate the pressure differential that would otherwise encourage media ingestion; vented air is used to further drive flush media from the ingestion pathway.

FIGS. 15-18 illustrate an alternate valve system 50. In this embodiment, the flush plate 54 has a first plate opening 56 and a second plate opening 58. The second plate opening 58 is illustrated as an elongated vent opening having a slight curvature. This curvature generally tracks the curved perimeter 60 of the flush plate 54. The dimensions of the opening 58 may be a height that generally corresponds to the height of the housing vent opening 66, and a length that is longer than the length of the housing vent opening 66. This allows continued movement of the flush plate 54 to maintain an open vent line for a longer period of time. In one example, the length of the elongated vent openings 58 may be about three times the length of the housing vent opening 66. In other examples, the second opening 58 may generally mirror the size and shape of the housing vent opening 66. This option is illustrated by FIGS. 22-25. In FIGS. 22-25, the valve system has a second plate opening that is a round opening 58'. It should be understood that the second plate opening 58 may have alternate shapes as well. The general intent is that when be opening 58 aligns (at least partially or fully) with the housing vent opening 66, the system is allowed to vent.

The valve system 50 also includes a housing 62. The figures show a front view of one half of the housing 62 having a transparent honeycomb pattern, but it should be understood that other materials, transparency options, and pattern options are possible for use. The housing 62 features a waste opening 64 (which is generally formed by alignment between an inlet on one housing half and an outlet on the other housing half, as described above). The housing 62 also has a vent opening 66. In one specific example, the vent opening 66 cooperates with the vent line 68 illustrated by FIG. 19. The vent opening 66 functions as an air intake opening. Air may be taken in via the vent line 68 via an optional muffler 82. However, it is possible to provide a system without the muffler and to allow air to be drawn into any type of opening along a vent line 68.

Figure 21:
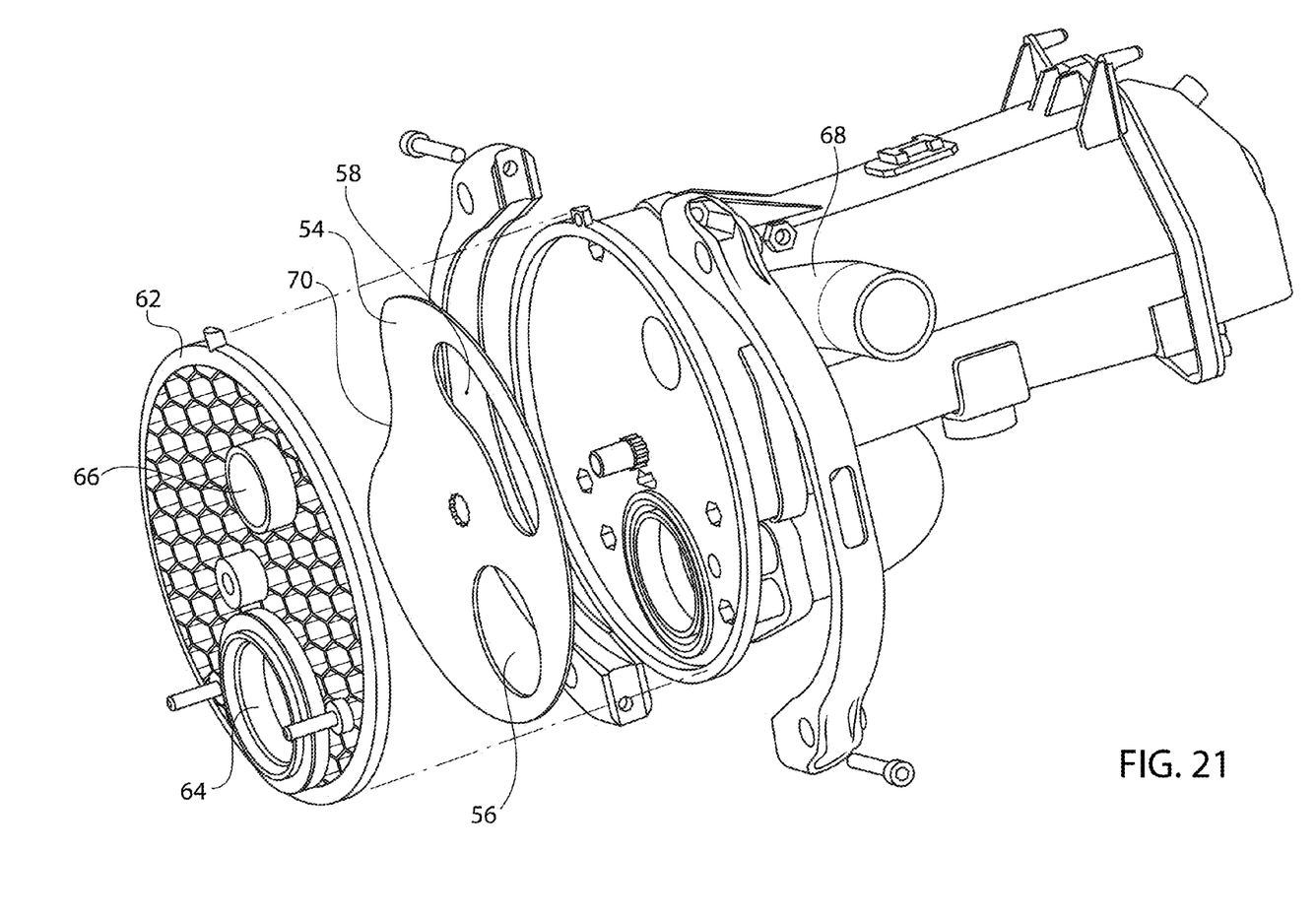
FIG. 21 shows a side exploded view of the valve system of FIGS. 15-18.
Figures 22, 23:
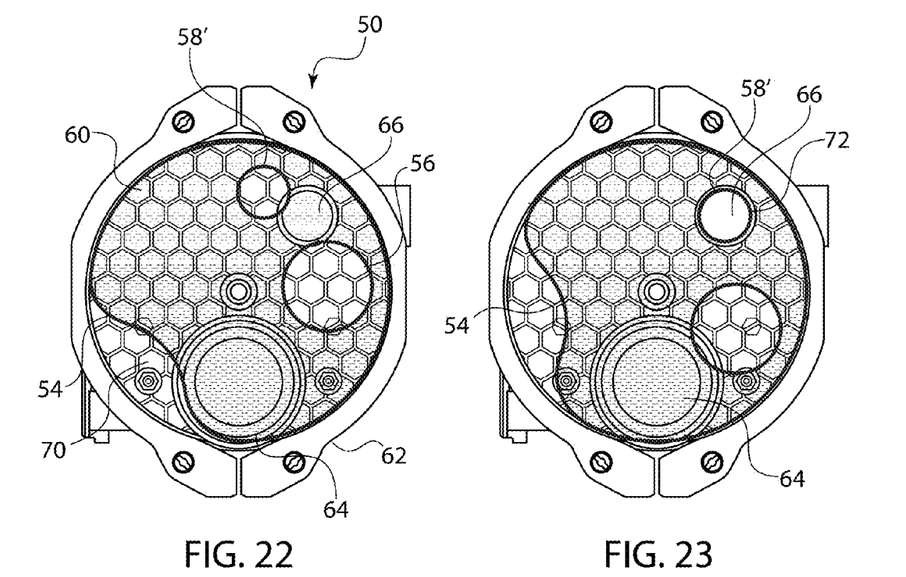
FIG. 22 shows a front plan view of another example of a valve system having a round vent opening in the flush plate in a first configuration.
FIG. 23 shows a front plan view of the valve system of FIG. 22 in a second configuration.
Figure 24:
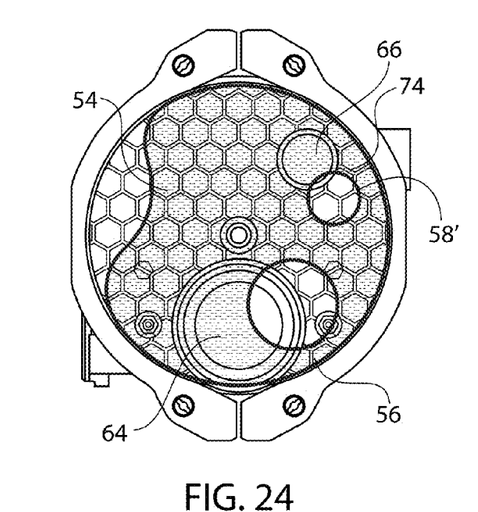
FIG. 24 shows a front plan view of the valve system of FIG. 22 in a third configuration.
Figure 25:
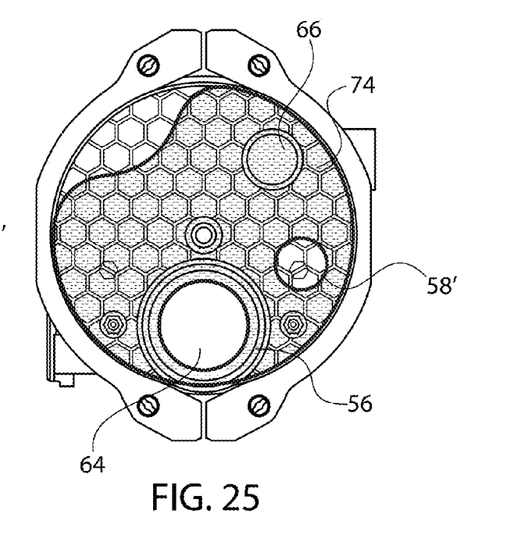
FIG. 25 shows a front plan view of the valve system of FIG. 22 in a fourth configuration.

In a particular example, the flush plate 54 is sandwiched between two housing halves such that it is rotatable within a space therebetween. This is illustrated by FIG. 21. When the flush plate 54 rotates, the first opening 56 and the second opening 58 move with respect to the housing waste opening 64 and the vent opening 66. As described above, it is possible to provide additional openings or ports on the flush plate 54 and/or the housing 62. In the example shown, flush plate 54 also has an area 70 of removed material. Rather than providing a completely circular flush plate 54, it is possible to provide the flush plate 54 as less than a complete circle in order to help reduce weight. Extraneous material is machined away from the flush plate or it is not manufactured during the initial casting process of the plate. (A similar removal of material or non-manufacture of material is illustrated by the flush plate 14 of FIG. 5, which shows a half-moon shaped flush plate rather than a completely circular flush plate.) If there are portions where a flush plate surface is not needed in order to block one of the housing/flush openings, material may be removed from or otherwise not present or manufactured in that particular portion.

Figure 15:
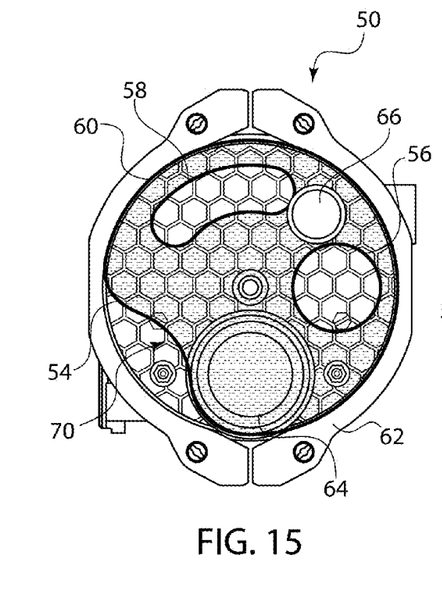
FIG. 15 shows a front plan view of one example of a valve system in a first configuration.
Figure 16:
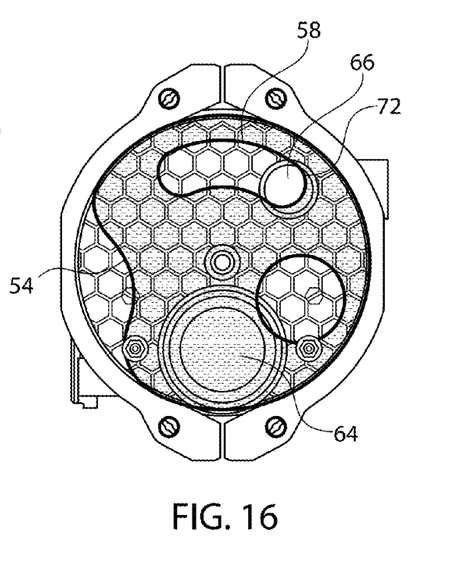
FIG. 16 shows a front plan view of the valve system of FIG. 15 in a second configuration.

FIG. 15 illustrates a first configuration in which the flush plate 54 closes both the waste opening 64 and the vent opening 66. FIG. 16 illustrates a second configuration in which the flush plate 54 moves such that one end 72 of an elongated vent opening 58 lines with the vent opening 66. In this example, the end 72 of the elongated vent opening 58 has a curved edge such that it generally corresponds to the curvature of the vent opening 66. The waste opening 64 remains closed. This configuration allows venting/air exchange to begin without waste movement/application of vacuum to the waste opening 64.

Figure 17:
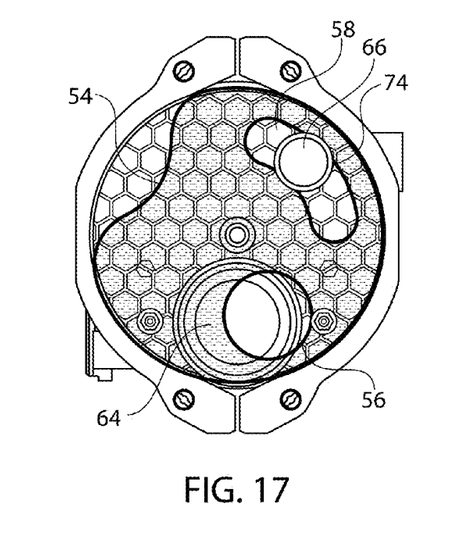
FIG. 17 shows a front plan view of the valve system of FIG. 15 in a third configuration.
Figure 18:
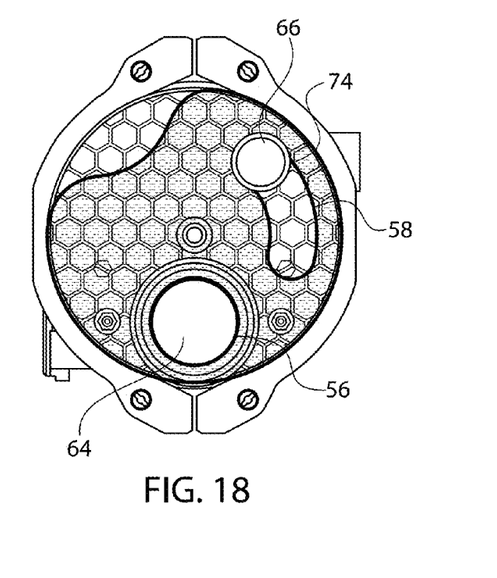
FIG. 18 shows a front plan view of the valve system of FIG. 15 in a fourth configuration.

FIG. 17 illustrates a third configuration in which the flush plate 54 continues to move such that a midportion 74 of the elongated opening 58 remains aligned with the vent opening 66. This allows venting/air exchange to continue to occur. The first plate opening 56 also moves into partial alignment with the waste opening 64. This allows the beginning of application a vacuum to the waste opening 64. FIG. 18 illustrates a fourth configuration in which the flush plate 54 continues to move such that another end portion 74 of the elongated vent opening 58 continues to allow the vent opening 66 to be open. The first plate opening 56 is also in complete or substantially complete alignment with the waste opening 64, allowing full application of vacuum. The practical effect of the shape of the elongated vent opening 58 is that any time that the waste opening 64 is open, the vent opening 66 is also open to vent. When the flush plate is to be closed, it moves through the reverse order (from FIGS. 18, 17, 16, to 15 or from FIGS. 25, 24, 23, to 22.). This open vent helps reduce/dampen the noise of the flush. In specific examples, the flush sound/noise may be dampened from decibel ranges that are in the low hundreds to decibel ranges that are in the 80-90 s.

Figure 19:
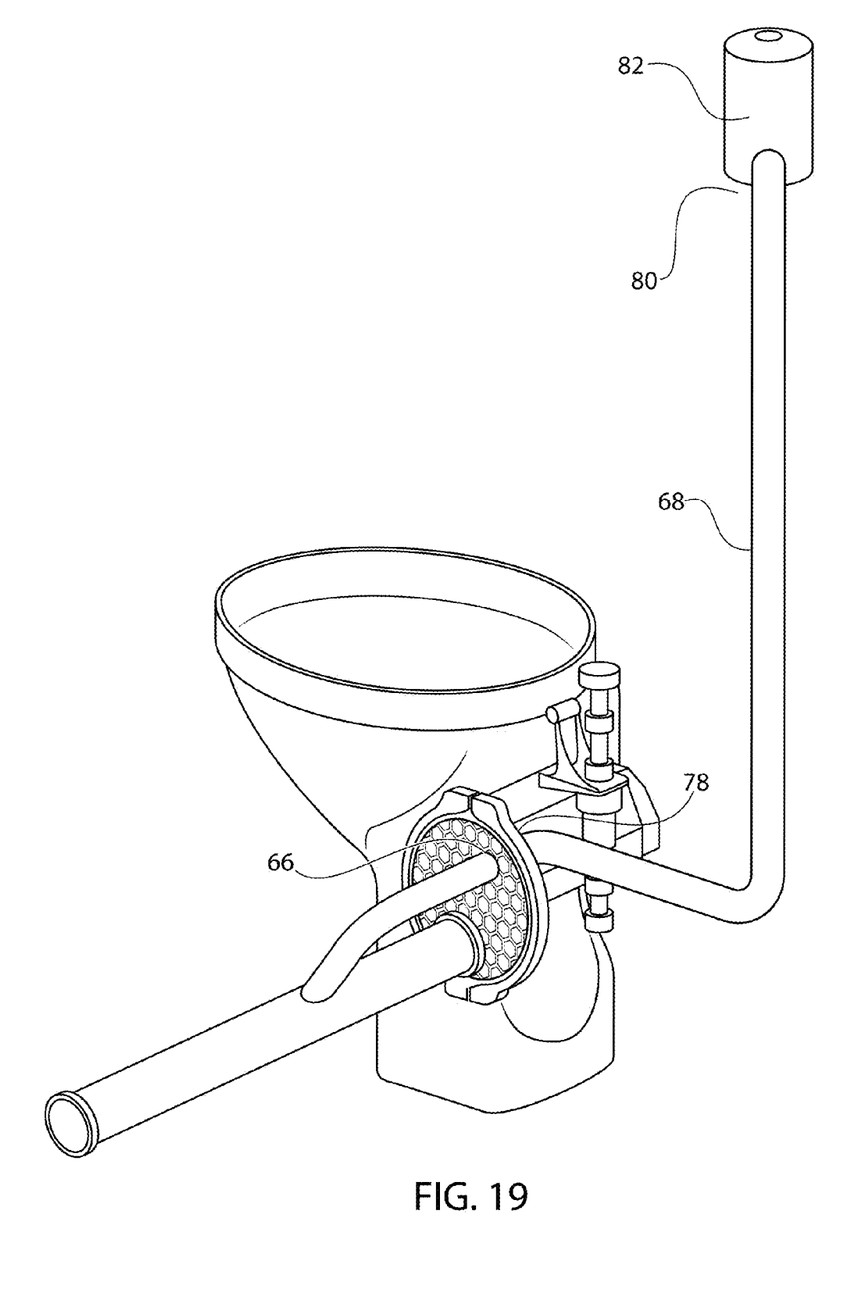
FIG. 19 shows a side perspective view of a toilet basin with a vent line and sound muffler.

Referring to FIG. 19, the vent line 68 is fluidly associated with the housing vent opening 66. The vent line 68 generally has one end 78 that is secured to the housing vent opening 66. When the flush plate 54 is rotated such that the housing vent opening 66 is open (or partially open), venting occurs via air intake at an upper vent line end 80. A muffler 82 may be positioned at the end of the upper vent line end 80 in order to help reduce air intake sound.

Figure 20:
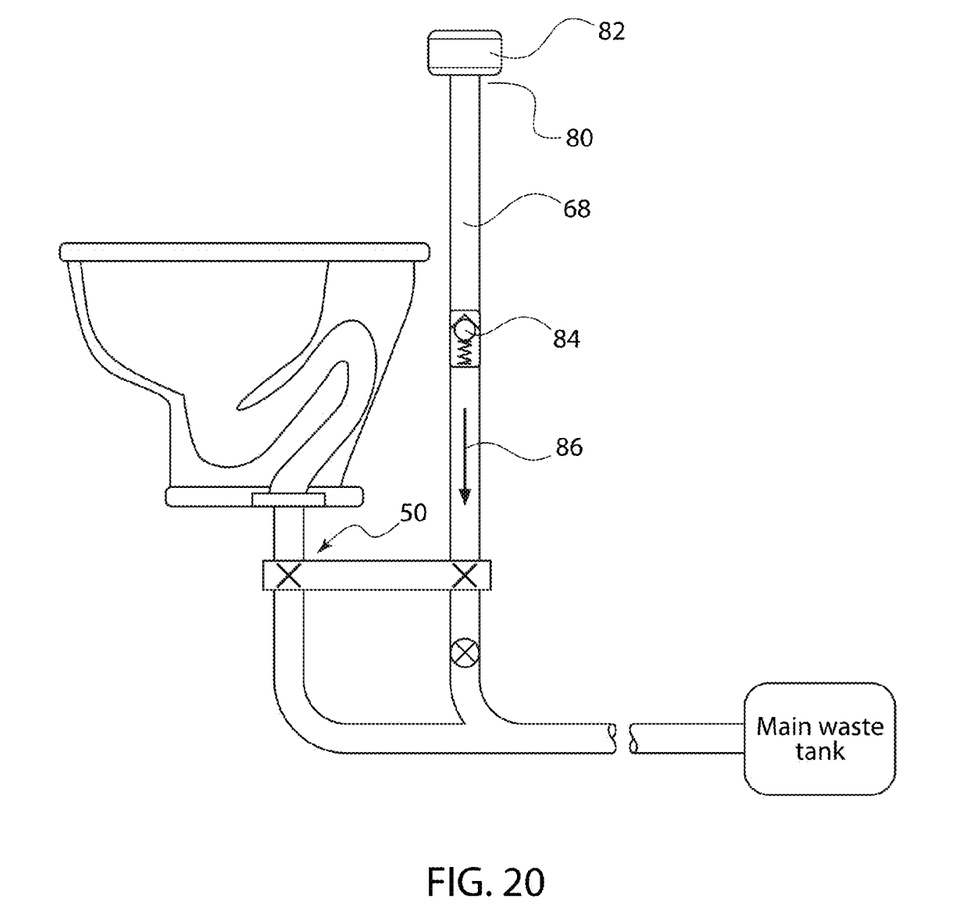
FIG. 20 shows a side schematic view of a toilet basin having alternate embodiments of check valves.

Referring now to FIG. 20, in certain embodiments, the vent line 68 is provided with a check valve 84. The check valve 84 is installed along the vent line 68. In the example shown, the check valve 84 is positioned between the flush valve system 50 and the upper end of the vent line 80/muffler 82, along the airflow path 86. In other examples, it is possible to install the check valve 84 downstream of the flush valve system 50, between the flush valve system 50 and the main waste tank.

Check valve 84 provides improved functioning at ground level, when the aircraft is not flying and a vacuum generator is required to generate vacuum. The check valve 84 is used to moderate airflow. As background, when an aircraft is in flight and at a high pressure differential, minimal power is required for the flush due to the natural differential pressure, which creates a strong vacuum that flows waste from the bowl to the main waste tank. By contrast, when an aircraft is at ground level, power is required to run the vacuum generator in order to create the vacuum that flows waste from the bowl to the main waste tank. The use of extraneous power when the aircraft in on ground is undesirable, so the vacuum generator is generally not set to a level that approximates the vacuum generated by the differential pressure that is present during flight. Instead, the vacuum power generated for ground use is usually lower than what is likely optimal for the highest quality flush. There is a lower air flow for the flush when the aircraft is at ground level, and lower air flow can result is a lesser quality flush.

Accordingly, the present flush system 50 provides a check valve 84 in the vent line 68/air flow path 86. The check valve 84 is set to open at pressure differentials above the vacuum generator levels (used for ground use). This means that the check valve 84 is configured to remain open during flight, allowing the optional muffler 82 to provide its desired sound dampening effects and providing sufficient airflow to move the waste and achieve a clean flush. The presence of the check valve 84 may also stop flow in the event that there is a positive pressure inside the waste system. This can prevent waste from exiting the system in an undesired location.

The check valve 84 stays closed during ground use. For use on ground, the check valve 84 closes the airflow path 86 to the muffler 82 in the vent line 68, preventing air/vacuum from flowing through the vent line 68; air/vacuum is stopped at the check valve 84. Without wishing to be bound any theory, it is believed that the quiet flush concepts described herein—which include the elongated vent opening 58 and the air muffler 82—while effective in flight, could lessen the potential efficacy of the flush on ground if air were allowed to flow through the vent line. Maintaining the check valve 84 closed during ground level use prevents such airflow.

Movement of the plate 14 may be controlled in any appropriate manner. In one embodiment, movement may be controlled by driving action of an actuator or motor, which is transferred by a gear assembly. A drive mechanism may selectively rotate the flush plate 14 between its various positions. The motor or actuator may be activated by any number of pre-set cues. For example, the movement of plate 14 may be governed by a vacuum or pressure sensor, which senses vacuum pressure and is set to move the flush plate 14 upon a set vacuum level. The movement of plate 14 may be governed by an electrical signal which is set to activate the flush plate 14 upon a set number of flushes or at set time intervals. The movement of plate 14 may be governed by a level sensor, which senses a liquid or waste level in the intermediate holding tank 16 and is set to move the flush plate 14 upon a set level reading. The movement of plate 14 may be governed by a manual override, which allows a user to move the flush plate 14 as desired. The movement of plate 14 may be governed by any appropriate sensor, such as a pressure-based sensor, a capacitance-based sensor, or any other appropriate sensor sufficient to detect the presence or absence of waste in the intermediate holding tank 16.

In one specific system, a vacuum sensor, pressure sensor, electrical sensor, or any other sensor indicates a vacuum level or waste level to the system, indicating that a flush is needed. The system may alternatively be time-based or flush-based, indicating that a flush is needed after a certain amount of time or a certain number of flushes have occurred. The system may alternatively be manually activated, such that one in the lavatory can indicate that the holding tank should be cleared. In any event, a signal is sent to the system controller to indicate that a flush of the tank 16 should occur.

Figure 13:
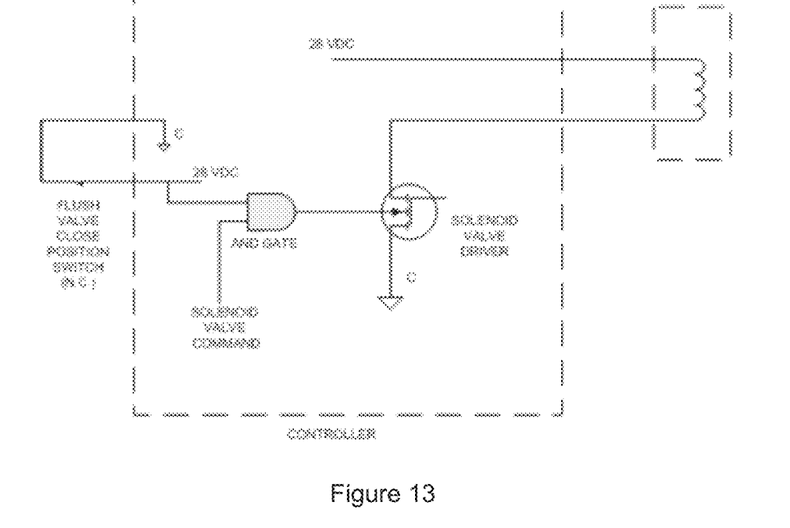
FIG. 13 shows one example of a potential electrical sequence for controlling the valve system.

The signal may be sent or controlled via a solenoid as shown in FIG. 13. The controller then activates a movement of the flush plate 14 to the Position 2—the flush position. Once the flush of the tank 16 has occurred, the controller can indicate that the plate 14 should move to the waste opening 23 closed position, which is either Position 1 or 3. In Position 1, both the waste opening 23 and the vent 26 are closed, which does not allow any fluid or air flow at all. In Position 3, the tank 16 is exposed to vacuum through vent 26, without evacuating the waste. This may be the default position, depending upon the pressure that the tank 16 is designed to withstand.

The flush plate 14 may also generally be sealed at the interface between the housing interior and the waste system. Any type and number of appropriate seals may be used in connection with the disclosure provided, as long as the seals allow the plate to rotate along its axis of rotation within the housing 12.

Benefits provided by the multi-port valve described include allowing the toilet to conduct a normal flush sequence, but providing a valve system that allows an intermediate holding tank to be used. The intermediate holding tank may hold waste but be flushed as needed, without exposing the entire toilet system to vacuum at all times. This valve design allows the two-stage flush toilet to work more effectively. Other benefits provided are that the valve reduces noise experienced in the cabin and surrounding areas by limiting the exposure of the system to vacuum to only times as needed. The valve may also be designed to open and close quickly, and in many cases, in less than one second and in some instances, in less than a half a second. Another benefit of the valve system is that it seals the cabin from odors when vacuum is not present or being applied. A further benefit it is that it can combine the functionality of two valves into a single valve, allowing the system to be lighter and more compact. One advantage of having a multi-port valve is that it can manage sequences of open and shut positions during the transfer of waste and eliminates the use of multiple single valves for managing each open and shut position. This saves weight and space on an aircraft waste handling system. FIG. 13 shows one embodiment of an electrical schematic involving various solenoid valves and gates in order to manage the running sequences of the multi-port valve system 10.

The valve system design generally controls the vacuum/pressure system of the waste management system for transporting waste from the toilet to the main waste tank onboard the aircraft. If the transfer of the waste from the toilet to the main waste tank is conducted via an intermediate holding tank, a two-stage flush is used.

Changes and modifications, additions and deletions may be made to the structures and methods recited above and shown in the drawings without departing from the scope or spirit of the invention and the following claims.

What is claimed is:

1. A valve, comprising:
    (a) a valve housing enclosing a flush plate;
    (b) the valve housing comprising a waste opening and a vent opening;
    (c) the flush plate comprising a first plate opening, an elongated vent opening, an axis of rotation,
    wherein rotation of the flush plate with respect to the axis of rotation either (i) closes the waste and vent openings of the housing, (ii) opens the vent opening of the housing by at least partially aligning the elongated vent opening of the flush plate with the vent opening of the housing, (iii) opens the waste opening of the housing by at least partially aligning the first opening of the flush plate with the waste opening of the housing, or a combination of (ii) and (iii), wherein whenever the waste opening of the housing is open to vacuum, the vent opening of the housing is also open to vent.

2. The valve of claim 1, wherein the flush plate allows both the waste and vent openings of the housing to be simultaneously open.

3. The valve of claim 1, wherein movement of the flush plate is activated by a vacuum sensor, a pressure sensor, a capacitance sensor, or a level sensor.

4. The valve of claim 1, wherein movement of the flush plate is activated by a manual activation feature.

5. The valve of claim 1, wherein the elongated vent opening comprises a curved opening having a height that approximates a height of the vent opening of the housing and having a length that is longer than a length of the vent opening of the housing.

6. The valve of claim 1, further comprising vent line in fluid communication with the vent opening of the housing.

7. The valve of claim 1, wherein the vent line comprises a check valve in its flow path.

8. The valve of claim 1, wherein the housing comprises plastic, a thermoplastic resin, a polymeric material, polyetherimide, nylon, polypropylene, acrylonitrile butadiene styrene, polyethylene, stereolithography resin, carbon composite material, carbon fibers in an epoxy matrix, polycarbonate, or any combination thereof.

9. The valve of claim 1, wherein the flush plate comprises a metallic material.

10. The valve of claim 1, wherein the flush plate comprises plastic, a thermoplastic resin, a polymeric material, polyetherimide, nylon, polypropylene, acrylonitrile butadiene styrene, polyethylene, stereolithography resin, carbon composite material, carbon fibers in an epoxy matrix, polycarbonate, or any combination thereof.

11. The valve of claim 1, wherein the flush plate is coated with a non-corrosion material, a non-stick material, or a combination thereof.

12. A valve system for an aircraft vacuum toilet lavatory, the valve system, comprising:
(a) a valve housing enclosing a flush plate;
(b) the valve housing comprising a waste opening and a vent opening;
(c) the flush plate comprising a first plate opening, an elongated vent opening, an axis of rotation, and
(d) a vent line associated with the valve housing and venting to the lavatory atmosphere;
wherein rotation of the flush plate with respect to the axis of rotation either (i) closes the waste and vent openings of the housing, (ii) opens the vent opening of the housing by at least partially aligning the elongated vent opening of the flush plate with the vent opening of the housing, (iii) opens the waste opening of the housing by at least partially aligning the first opening of the flush plate with the waste opening of the housing, or a combination of (ii) and (iii), wherein whenever the waste opening of the housing is open to vacuum, the vent opening of the housing is also open to vent;
wherein the vent line comprises a check valve in its flow path.

* * * * *